United States Patent [19]
Alger-Meunier et al.

[11] Patent Number: 5,864,581
[45] Date of Patent: Jan. 26, 1999

[54] APPARATUS FOR MEASURING THE SIGNAL TRANSIT TIME OF A DIGITAL TRANSMISSION DEVICE

[75] Inventors: Michael Alger-Meunier, Haar; Yousif Ammar; Ronalf Kramer, both of München, all of Germany

[73] Assignee: Siemens Aktiengesellschaft, Munich, Germany

[21] Appl. No.: 711,021

[22] Filed: Sep. 9, 1996

[30] Foreign Application Priority Data

Sep. 7, 1995 [DE] Germany .................. 195 33 113.3

[51] Int. Cl.⁶ ...................... H04B 17/00; H04B 17/02; H04M 1/24; H04Q 7/00
[52] U.S. Cl. ...................... 375/224; 375/211; 375/213; 379/1; 379/27; 455/33; 455/456
[58] Field of Search ...................... 375/224, 211, 375/213, 219, 220; 379/1, 27, 28; 455/456, 676, 524, 33, 31, 53; 324/74; 340/825.69; 342/457

[56] References Cited

U.S. PATENT DOCUMENTS

| | | | |
|---|---|---|---|
| 4,607,257 | 8/1986 | Noguchi | 340/825.69 |
| 4,667,202 | 5/1987 | Kammerlander et al. | 455/67.6 |
| 4,800,509 | 1/1989 | Nimmersjo | 364/492 |
| 4,907,290 | 3/1990 | Crompton | 455/524 |

FOREIGN PATENT DOCUMENTS 37 29 586  3/1989  Germany .

*Primary Examiner*—Chi H. Pham
*Assistant Examiner*—Khai Tran
*Attorney, Agent, or Firm*—Herbert L. Lerner; Laurence A. Greenberg

[57] ABSTRACT

A signal transmission apparatus includes a higher-level station, a lower-level station and a digital transmission device connected between the stations and having a signal transit time to be measured. Each of the stations has a transmitter for sending useful signals, each clocked by a respective clock signal, through the transmission device to other station. Each of the stations has a receiver for receiving the useful signals clocked by the other station and for separating out the clock signal superimposed on the applicable useful signal. The useful signal to be transmitted in the higher-level station is clocked by a given clock signal. The useful signal to be transmitted in the lower-level station is clocked by a clock signal derived from the clock signal separated out from the receiver of the lower-level station. The higher-level station has a phase comparator for comparing the given clock signal with the clock signal separated out by the receiver of the higher-level station and supplying a comparison outcome. The higher-level station has an arithmetic unit for calculating the signal transit time from the comparison outcome.

4 Claims, 1 Drawing Sheet

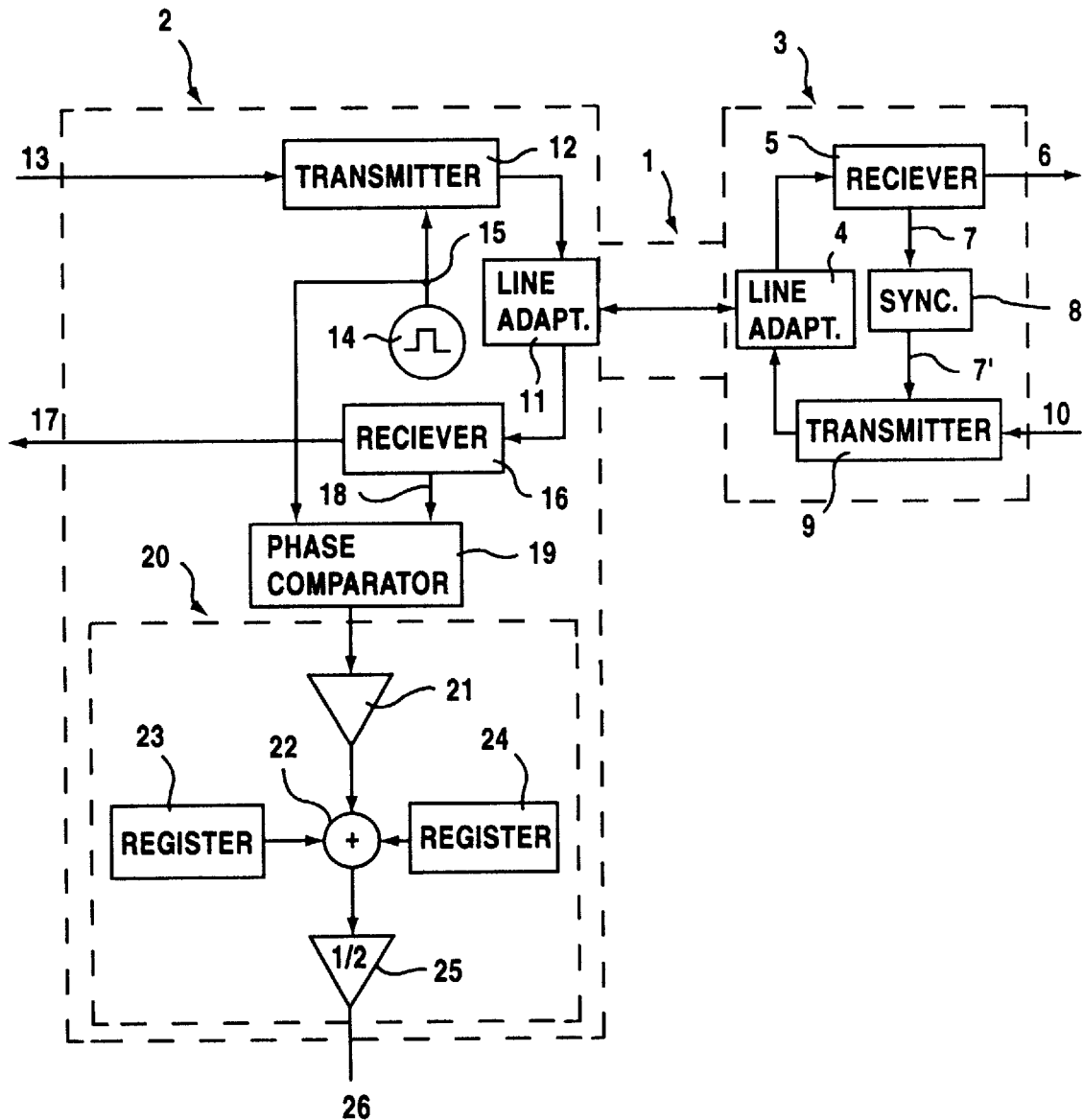

APPARATUS FOR MEASURING THE SIGNAL TRANSIT TIME OF A DIGITAL TRANSMISSION DEVICE

BACKGROUND OF THE INVENTION

FIELD OF THE INVENTION

The invention relates to an apparatus for measuring the signal transit time of a digital transmission device connected between a higher-level station and a lower-level station.

The signal transit time of a transmission device can fluctuate sharply, depending on the structure of the device. If a wire connected is used as the transmission medium, the signal transit time is especially dependent on the line length. Maintenance of the transmission device, in applications with radio-in-the-loop (RITL) and in use in systems with cordless telephone terminals by the DECT Standard, it is necessary to be able to determine the line transit time of each section, and optionally the resultant proportional line length, individually. Heretofore, such measurements have been made manually, using external measuring instruments, as needed.

SUMMARY OF THE INVENTION

It is accordingly an object of the invention to provide an apparatus for measuring the signal transit time of a digital transmission device, which overcomes the hereinafore-mentioned disadvantages of the heretofore-known devices of this general type and in which the measurement of the signal transit time can be performed at any time and automatically.

With the foregoing and other objects in view there is provided, in accordance with the invention, a signal transmission apparatus, comprising a higher-level station; a lower-level station; and a digital transmission device connected between the higher-level station and the lower-level station, the transmission device having a signal transit time to be measured; each of the stations having a transmitter for sending useful signals, each clocked by a respective clock signal, through the transmission device to other of the stations; each of the stations having a receiver for receiving the useful signals clocked by the other of the stations from the transmission device, the receivers separating out the clock signal superimposed on the applicable useful signal; the useful signal to be transmitted in the higher-level station being clocked by a given clock signal; the useful signal to be transmitted in the lower-level station being clocked by a clock signal derived from the clock signal separated out from the receiver of the lower-level station; the higher-level station having a phase comparator for comparing the given clock signal with the clock signal separated out by the receiver of the higher-level station and supplying a comparison outcome; and the higher-level station having an arithmetic unit connected to the phase comparator for calculating the signal transit time from the comparison outcome.

In accordance with another feature of the invention, the arithmetic unit has registers for storing signal transit times of the stations in memory, and the arithmetic unit weights the comparison outcome with a conversion factor, subtracts the signal transit times from it, and divides a resultant difference by two for obtaining the signal transit time of the transmission device.

In accordance with a concomitant feature of the invention, the arithmetic unit ascertains a corresponding line length by multiplying the signal transit time by a further conversion factor.

The measurement of a digital transmission device is carried out by a higher-level station in interaction with a lower-level station that are connected through the digital transmission device. The superimposed clock pulses in useful signal transmission and the dependency of one clock pulse on another are used for the measurement. The additional expenditure for the measuring instrument is relatively slight, since devices for clocking and recovering the clock pulse as a rule are already present both in the higher-level station and the lower-level station. Besides, only one phase comparator accordingly has to be provided, which evaluates the clock signals of the useful signal to be transmitted and of the received useful signal in the higher-level station. The corresponding value of the signal transit time is ascertained from this evaluation, in the following arithmetic unit.

In the event that the signal transit times in the higher-level station and the lower-level station are not negligible, then after conversion of the phase difference into a signal transit time by calculation, the signal transit times in the higher-level station and/or the lower-level station are subtracted from it. The result of subtraction is divided by two, because of the doubling of the signal transit time as a consequence of the outgoing and returning travel of the signal.

Other features which are considered as characteristic for the invention are set forth in the appended claims.

Although the invention is illustrated and described herein as embodied in an apparatus for measuring the signal transit time of a digital transmission device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a block circuit diagram of an exemplary embodiment of the invention.

DESCRIPTION OF THE PREFERRED EMBODIMENTS

Referring now in detail to the single FIGURE of the drawing, there is seen an exemplary embodiment of an apparatus according to the invention, in which a transmission device 1, for instance a telephone line, is connected between a higher-level station 2, for instance a switching station, and lower-level station 3, such as a subscriber terminal. The lower-level station 3 includes a line adaptation and termination circuit 4, which is bidirectionally coupled to the transmission device 1. Signals received through the transmission device 1 are carried by the line adaptation and termination circuit 4 to a reception circuit 5, which extracts both a useful signal 6 and a clock signal 7 from the signals. The clock signal 7 is delivered directly, or with the interposition of a synchronizing device 8, in the form of a clock signal 7' to a transmitter 9, which superimposes a useful signal 10 on the clock signal 7' and transmits a resultant signal through the line adaptation and termination circuit 4 and the transmission device 1 to the higher-level station 2.

The higher-level station 2 likewise includes a line adaptation and termination circuit coupled bidirectionally to the transmission device 1, namely a line adaptation and termination circuit 11 which receives a signal from a transmitter 12. In the transmitter 12, a clock signal 15 generated by a clock generator 14 is superimposed on a useful signal 13. The line adaptation and termination circuit 11 is also connected to a receiver 16, which receives signals transmitted by the lower-level station 3 and extracts both a useful signal 17 and a clock signal 18 from the signals.

In order to ascertain the signal transit time in the transmission device 1, the clock signals 15 and 18 are supplied to a phase comparator 19, such as a phase detector, that ascertains a phase displacement between the two clock signals 15 and 18. An outcome of the comparison is then supplied to an arithmetic unit 20. The arithmetic unit 20 weights the outcome of the comparison, through the use of a coefficient multiplier 21, with a conversion factor that converts the outcome of the comparison into an appropriate chronological dimension. However, if the phase comparator 19 is constructed accordingly the conversion factor may equal 1, in which case the coefficient multiplier can be dispensed with. The coefficient multiplier 21 is followed by a subtractor 22, which subtracts the contents of two registers 23 and 24 from the weighted phase comparison outcome. Signal transit times for the higher-level station 2 and the lower-level station 3 are stored in memory in the registers 23 and 24. If the signal transit times in the higher-level station 2 and/or the lower-level station 3 are negligible as compared with the signal transit time in the transmission device 1, then the register 23, the register 24 and/or the subtractor 22 may be omitted. The outcome of subtraction is then divided in half by a further coefficient multiplier 25, producing a signal 26 that reproduces the signal transit time in the transmission device 1.

Accordingly, the information present in the higher-level station about the phase location of the transmission clock in comparison with the reception clock is evaluated for transit time measurement. The transmission clock is a signal which is synchronous with the pulses transmitted by the higher-level station. The reception clock is synchronous with the pulses of the lower-level station received in the higher-level station. The transmission and reception clocks are linked together in a known manner in the lower-level station. Accordingly, the phase location of the transmission and reception clocks in the higher-level station are composed both of a respective constant and known delay time in both the higher-level station and the lower-level station, and a component provided by twice the line transit time. The reason for twice the line transit time is that the transmission device must experience the passage through it of both the transmission and the reception signal once each. The clock period on which the transmission and reception clocks are based may be relatively long, if only every $n^{th}$ transmission or reception pulse is evaluated. A counter begins with the transmission pulse and counts until the arrival of the reception pulse. The result is output as a binary number having the resolution of the counting speed, for instance in the form of a display or for further processing in a data processing device. Through the use of a suitable choice of the counting speed, it is possible for the binary number to be output in the form of a fixed time unit or as a line length, for instance.

With the present invention, the measurement can be repeated continuously at short intervals (such as 50 ms). Thus not only slow changes in transit time, of the kind caused by temperature fluctuations, for instance, but fast changes, the detection of which is especially significant for cordless mobile applications, can be ascertained.

Moreover, the initiation of a transit time measurement can be carried out not only from the higher-level station but from the lower-level station as well, if the lower-level station requests a measurement by a special message, for instance through a signaling channel. In the opposite direction, the higher-level station can inform the lower-level station of the outcome of transit time measurement, for instance through the use of a control, data or signaling channel.

Finally, the synchronizing device 8 may be constructed in such a way that a predetermined delay time of the lower-level station can be established, as a result of which a constant transit time, for instance meeting a standard value, in the lower-level station is attained.

We claim:

1. A signal transmission apparatus, comprising:

a higher-level station;

a lower-level station; and a digital transmission device connected between said higher-level station and said lower-level station, said transmission device having a signal transit time to be measured;

each of said stations having a transmitter for sending useful signals, each clocked by a respective clock signal, through said transmission device to other of said stations;

each of said stations having a receiver for receiving the useful signals clocked by the other of said stations from said transmission device, said receivers separating out the clock signal superimposed on the applicable useful signal;

the useful signal to be transmitted in said higher-level station being clocked by a given clock signal;

the useful signal to be transmitted in said lower-level station being clocked by a clock signal derived from the clock signal separated out from said receiver of said lower-level station;

said higher-level station having a phase comparator for comparing the given clock signal with the clock signal separated out by said receiver of said higher-level station and supplying a comparison outcome; and said higher-level station having an arithmetic unit connected to said phase comparator for calculating the signal transit time from the comparison outcome, said arithmetic unit having registers for storing signal transit times of said stations in memory, and said arithmetic unit weighting the comparison outcome with a conversion factor, subtracting the signal transit times from the weighted comparison outcome, and dividing a resultant difference by two for obtaining the signal transit time of said transmission device.

2. The apparatus according to claim 1, wherein said arithmetic unit ascertains a corresponding line length by multiplying the signal transit time by a conversion factor.

3. The apparatus according to claim 1, wherein said arithmetic unit ascertains a corresponding line length by multiplying the signal transit time by a further conversion factor.

4. A signal transmission apparatus, comprising:

a higher-level station;

a lower-level station; and a digital transmission device connected between said higher-level station and said lower-level station, said transmission device having a signal transit time to be measured;

each of said stations having a transmitter for sending useful signals, each clocked by a respective clock signal, through said transmission device to other of said stations;

each of said stations having a receiver for receiving the useful signals clocked by the other of said stations from said transmission device, said receivers separating out the clock signal superimposed on the applicable useful signal;

the useful signal to be transmitted in said higher-level station being clocked by a given clock signal;

the useful signal to be transmitted in said lower-level station being clocked by a clock signal derived from the clock signal separated out from said receiver of said lower-level station;

said higher-level station having a phase comparator for comparing the given clock signal with the clock signal separated out by said receiver of said higher-level station and supplying a comparison outcome; and said higher-level station having an arithmetic unit connected to said phase comparator for calculating the signal transit time from the comparison outcome, said arithmetic unit ascertains a corresponding line length by multiplying the signal transit time by a conversion factor.

* * * * *